Oct. 24, 1961  W. B. CUNNINGHAM  3,005,314
METHOD AND APPARATUS FOR FORMING TUNNELS OR OTHER
UNDERGROUND CONDUIT INSTALLATIONS
Filed Jan. 10, 1958  5 Sheets-Sheet 3
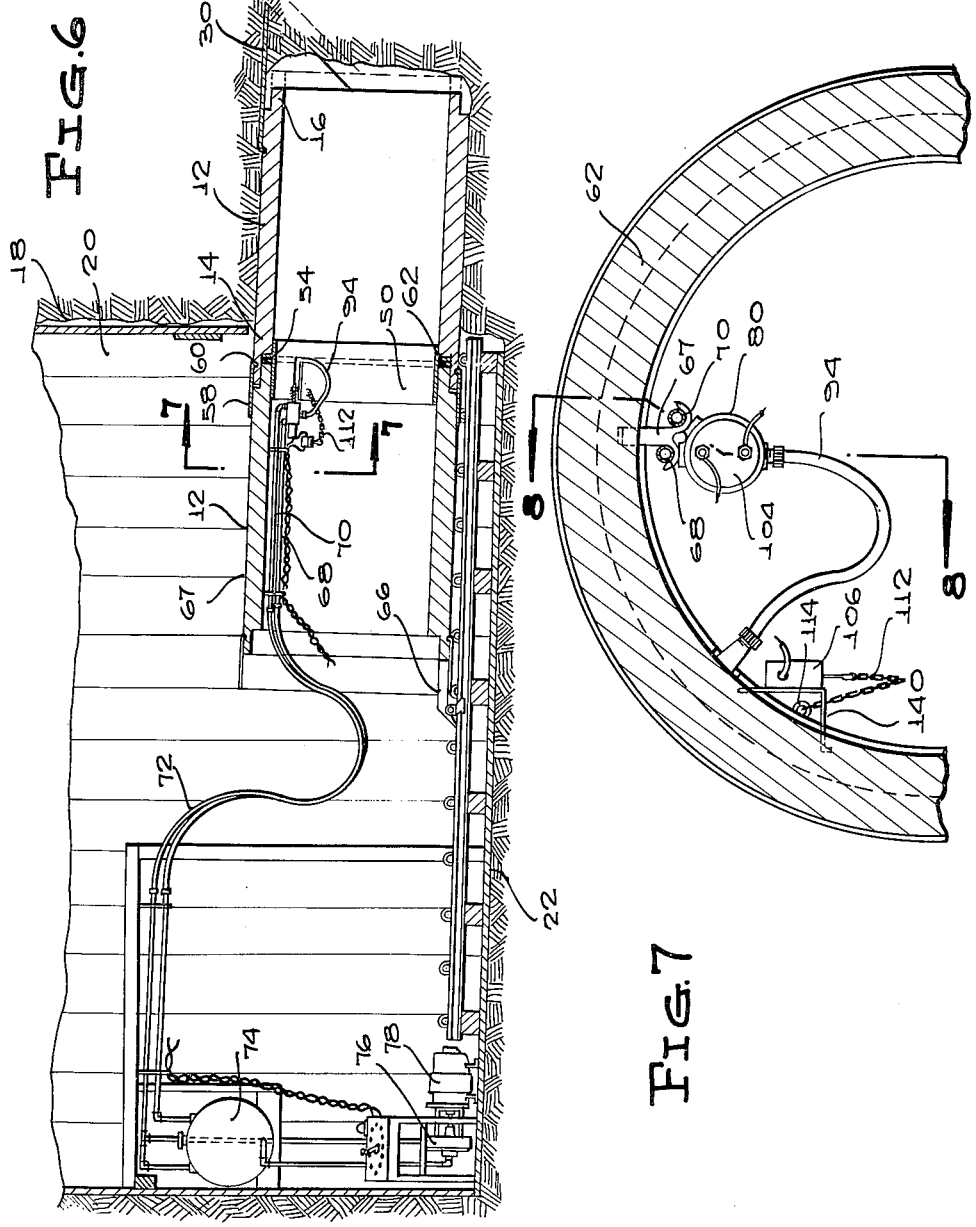
INVENTOR.
WESLEY B. CUNNINGHAM
BY
McMorrow, Berman + Davidson
ATTORNEYS

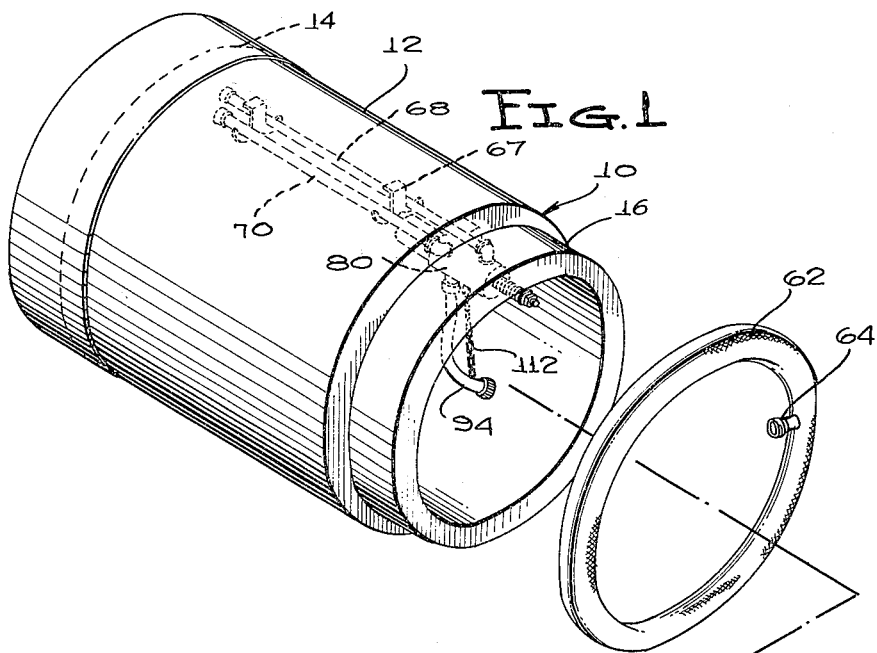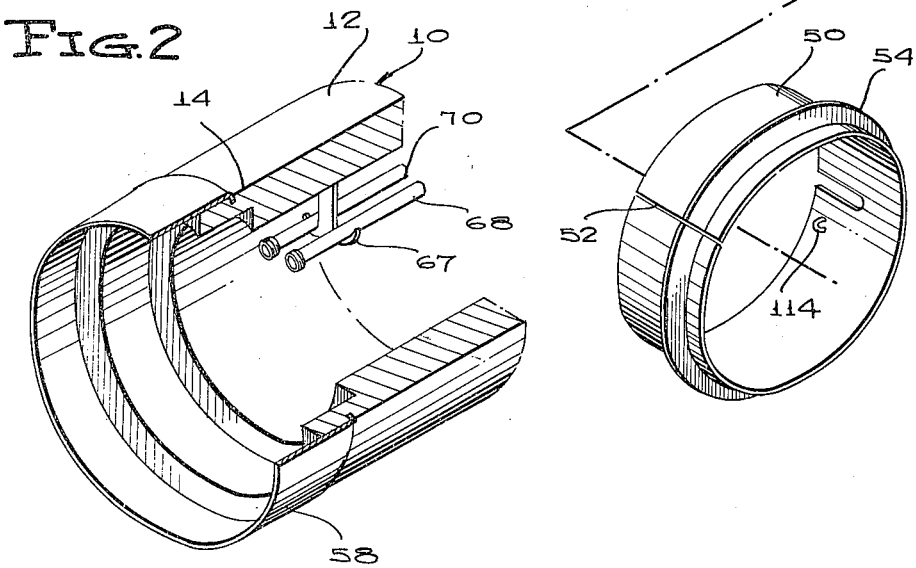

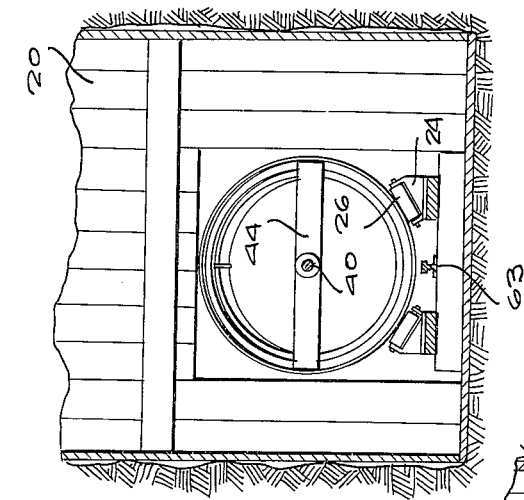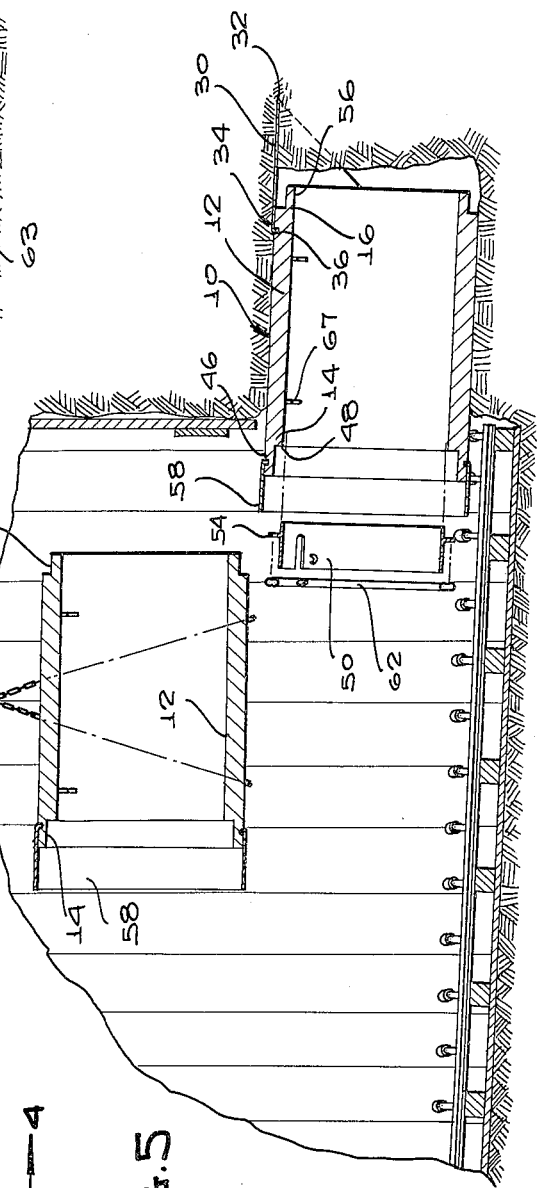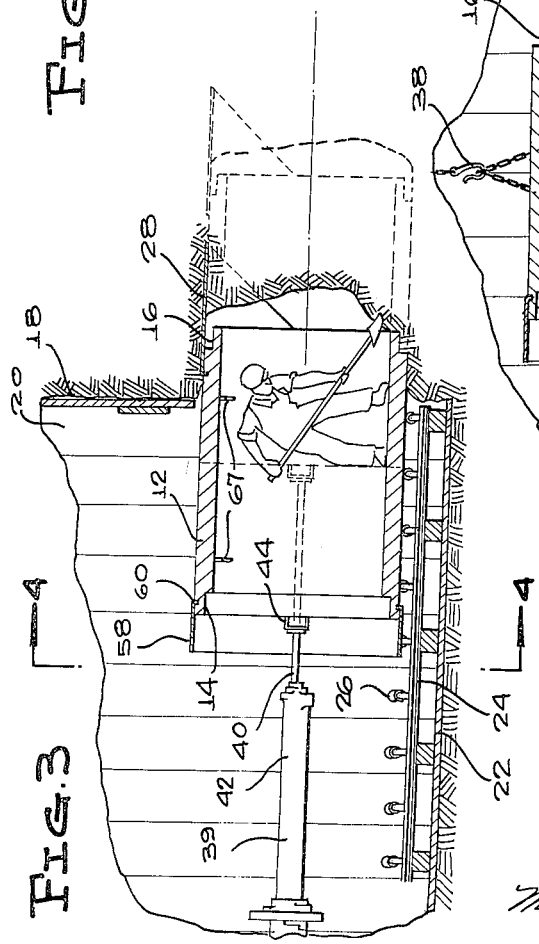

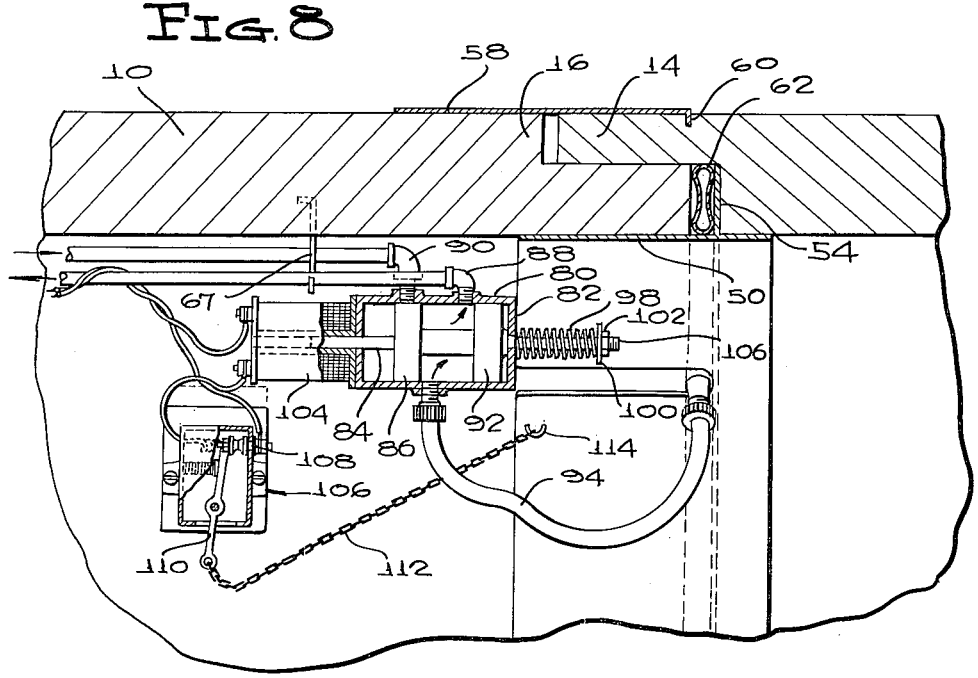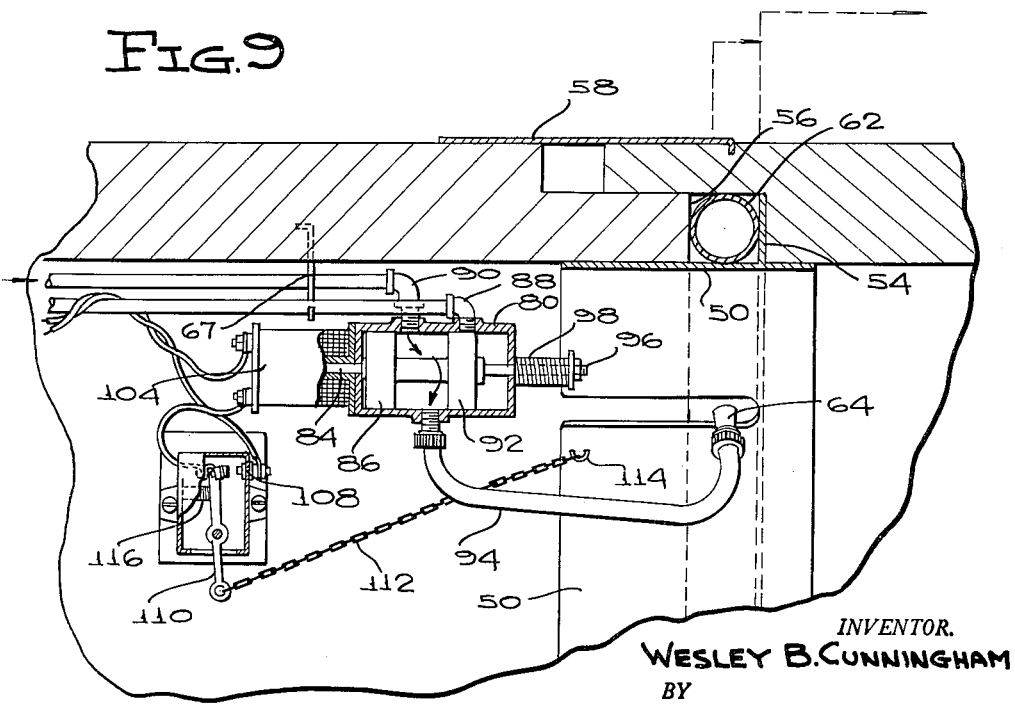

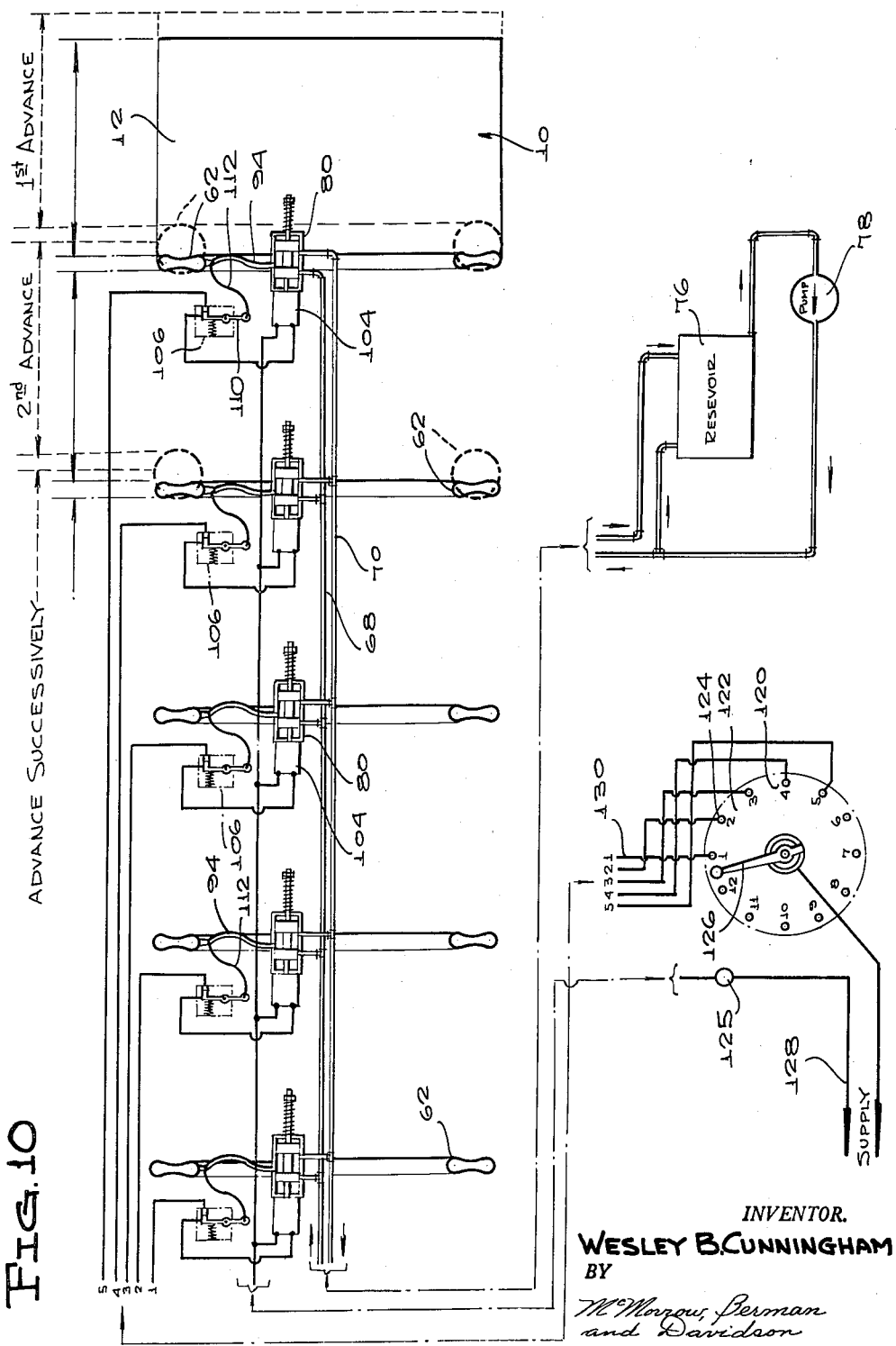

> United States Patent Office 3,005,314
Patented Oct. 24, 1961

3,005,314
METHOD AND APPARATUS FOR FORMING TUNNELS OR OTHER UNDERGROUND CONDUIT INSTALLATIONS
Wesley B. Cunningham, 2 Morris St., Charleston, W. Va.
Filed Jan. 10, 1958, Ser. No. 708,325
7 Claims. (Cl. 61—42)

This invention relates to an improved method and apparatus for installing tunnels and similar underground conduit installations, such as underground pipes, vaults or any other type of subterranean passageway for sewerage or drain purposes, for a road, railroad, canal, tunnel-like excavation and installations.

In present practice, subterraneous pipes, conduits or the like, irrespective of purpose and use, are installed by using jacks in conjunction with manual labor. The conduit elements, which form the tunnels, pipes or passageways, under the earth, are moved axially from shored up vertical working bores in the earth by means of jacks which apply a forward thrust to the conduit elements. Initially, an opening is excavated from the shored up bore by workmen, using tools and conventional methods, and then the initial conduit element is thrust into the opening by a jack. Further excavation of the tunnel is made by the workmen and then another conduit element is disposed in end-to-end relation with the initially positioned conduit element and again the jack is used to force the two conduit elements forwardly into the tunnel like opening or passageway. It is to be noted that the thrust is applied to the last installed conduit element in the string, as the conduit elements are coupled together in end-to-end relationship.

While this method is successful, it is quite limited in range since the jacking thrust can move but a limited number of the conduit elements when strung together. When the load or drag increases to a point where the conduit elements or pipes may be damaged by the pressure applied, the jacking must be discontinued. In this respect, it can be understood that with a string of conduit elements or pipes in a passageway and with the jacking thrust being applied to the last installed conduit element or pipe, that there is a definite tendency for the conduit elements to buckle and break since the jacking thrust cannot be equally transmitted from the last installed conduit element to the initially installed conduit element and evenly throughout the other conduit elements, which are disposed in the string.

Therefore, it can be understood that, when using the conventional jacking method, the range of installation is limited and the safety is definitely questionable, since cave-ins can occur. In addition, the cost is quite high because of the fact that considerable manual power and tools must be used in safely stringing the conduit elements or pipes together and advancing them into the passageway, as the passageway is being formed. Obviously, some heavy backup mechanisms must be employed to prevent the conduit elements from becoming untrained.

In some instances, tunnels or pipe lines are installed by using manual labor and tools, such as earth screws, drills and the like, which excavate a passageway that must be then shored up and lined by means of concrete or other linings which are disposed in the passageway and which must be secured together in a safe and secure manner.

The principal object of the present invention is to provide a method and means whereby tunnels, conduits, pipes or the like underground structures may be easily, inexpensively, unlimitedly and safely installed, such method and means being founded on the principle of moving the conduit elements or pipes in a one-by-one sequential manner. Thus, the initial conduit element or pipe is installed in the excavated passageway or tunnel and when the succeeding conduit element or pipe it attached thereto in end-to-end relationship, the first conduit element or pipe is thrust forwardly by means applying a direct thrust thereto. The next succeeding conduit element or pipe is thrust forwardly by means applying a direct thrust thereto. In such stringed or trained fashion, the conduit elements or pipes may be moved, without any limit as to the number or any limit as to the length of the passageway, the conduit elements or pipes being moved individually by an individual and direct thrust applied thereto and being moved in sequential manner from the initially installed conduit element, through to the other succeeding conduit elements, each receiving a direct and individual forward thrust to move it a predetermined distance.

Another important object of the present invention is to provide a method and means for installing tunnels, conduits and other subterranean pipe or conduit like installations whereby the conduit elements or pipe sections will be maintained in true alignment and can be extended in such alignment at any desired angle from the starting point of installation.

A further important object of the present invention is to provide such a method and means which will be considerably less expensive, since the possibility of cave-ins will be eliminated, and which will be considerably less expensive, since an inexpensive hydraulic medium can be used to supply the forward thrust individually imposed on each conduit or pipe structure and since the method and means permits the use of conveyor lines for the removal of earth, as the installation goes forward.

A still further object of the present invention is to provide a method and apparatus which is less costly than conventional methods and apparatuses because the present invention permits the installations of conduits or pipes in any amount without any limit as to the distance that the conduits or pipes may be laid, and without using any expensive and bulky equipment, which is costly and which is expensive in operation, and without preparing a passage for the conduit elements or pipe sections before the installation thereof.

The foregoing and ancillary objects are attained by this invention, the preferred embodiment of which is set forth in the following description and illustrated in the accompanying drawings, wherein:

FIGURE 1 is an exploded perspective view of one of the conduit elements or pipe sections, which are used in forming the tunnel or similar subterraneous conduit installation;

FIGURE 2 is a fragmentary perspective view, partly in section, of one end of such conduit element or pipe section;

FIGURE 3 is a longitudinal vertical sectional view of a tunnel installation, showing the initial steps in the method of this invention;

FIGURE 4 is a vertical, cross-sectional view taken on line 4—4 of FIGURE 3 and illustrates the means whereby the conduit elements or pipe sections are supported for movement into the subterraneous passageway; FIGURE 3 showing the movement of the first or initial conduit element or pipe section;

FIGURE 5 is a vertical sectional view, similar to FIGURE 3, and showing the first conduit element or pipe section in place, with the next succeeding conduit element or pipe section being lowered for movement into the passageway in structural relationship with the first conduit element or pipe section;

FIGURE 6 is a view similar to FIGURES 3 and 5 and shows the next step in the method, with the next succeeding conduit element or pipe section, that is shown in FIGURE 5 in a position being lowered into the working bore, being shown here in coupled relation with the initial or first conduit element or pipe section;

FIGURE 7 is an enlarged, fragmentary cross-sectional view taken on line 7—7 of FIGURE 6;

FIGURE 8 is a detailed, longitudinal, vertical sectional view taken on line 8—8 of FIGURE 7 and illustrates in detail the valve and switch mechanism associated with the individual thrust means for each conduit element or pipe section;

FIGURE 9 is a view, similar to FIGURE 8, and illustrates the valve means in an open position and shows the operation of the thrust means in moving one of the conduit element or pipe sections forwardly; and FIGURE 10 is a diagrammatic illustration of the control mechanism and hydraulic and electrical lines, which are controlled by such control mechanism, for effecting the individual and sequential movement of the conduit elements or pipe sections.

In accordance with the present invention, a subterraneous tunnel or pipe installation is installed by using conduit or pipe sections 10, shown specifically in FIGURES 1 and 2. Such elements, hereinafter referred to generally as pipe sections but with the reservation that such term encompasses any type of structural means which may be employed to form underground tunnels, conduits or pipes, irrespective of materials, purpose or use, include cylindrical body sections 12 which have stepped opposing ends 14 and 16. The end portion 16 constitutes the front or leading end of the pipe section and is outwardly stepped, while the end portion 14, which defines the rear or trailing end portion, is inwardly stepped. As can be seen in FIGURES 8 and 9, the stepped arrangement is provided so as to form a joint between the mating ends of the pipe sections, as the tunnel or conduit is installed.

With reference to FIGURE 3, the first step in the process of installing the tunnel or conduit is the conventional one of excavating a vertical bore 18, which is shored up by suitable shoring 20. Flooring 22 is positioned on the bottom of the bore, which constitutes a starting or work point in the formation of the tunnel or conduit. Tracks 24, which support rollers 26, are mounted on the flooring and the tracks are disposed in spaced parallel relation, with the rollers on each track being disposed in angular relation to support the pipe sections, as they are moved forwardly into the excavated passageway 28.

As shown in FIGURES 5 and 6, the initial pipe section is provided with a blade element 30, which is arcuate in cross-section and which is substantially triangular in vertical section so that it has a sharp leading edge 32. The arcuate blade element 30 is secured to the initial pipe section 12 by means of an annular flange 34 on the rear edge thereof, which flange is fitted in an arcuate external, peripheral groove 36 formed in the initial pipe section. The blade element surrounds the upper peripheral portion of the pipe section and projects forwardly therefrom to bite into the earth, as the pipe section is moved forwardly.

In the initial stage of installing the tunnel or conduit, the initial pipe section is lowered into the shored up bore 18 by a suitable hoist means, such as the hoist means 38, shown in FIGURE 5 in connection with the next succeeding pipe section. The initial pipe section is lowered by the hoist means onto the rollers 26 and is pointed in the direction of the passageway to be excavated for accommodating the conduit or pipe. A workman initiates the excavation of the passageway, using conventional tools, after the initial pipe section is thrusted into the earth by a conventional jack means 39. Such jack means includes a piston rod 40, which is actuated by piston means housed in a cylinder 42 and which has a cross bar 44 on its outer end. The ends of the cross bar engage diametrically opposed portions of the trailing or rear end of the initial pipe section and force the pipe section into the earth, with the blade element biting into the earth. As the initial pipe section is forced forwardly, the workmen excavate the earth within the confines of the internal diameter of the pipe section, as shown in FIGURE 3. This is conventional practice.

Referring again to FIGURE 5, it is to be noted that the rear end portion 14 of each pipe section is internally stepped so that the end portion is defined by an annular flange 46, which constitutes a prolongation of the outer wall of the cylindrical body portion 12, and an annular, inner shoulder 48.

In accordance with the present invention, an inner sleeve 50 is provided, the sleeve being axially split, as at 52 for a purpose to be described, and having an outer annular flange 54, which is formed adjacent the forward end of the sleeve. The sleeve 50 is inserted within the rearward end 14 of the initial pipe section with its flange 54 abutting the shoulder 48, as shown in FIGURE 6. The rear portion of the sleeve is spaced from the inner wall of the flange 46, with the sleeve being disposed within the confines of the inner wall of the pipe section. The flange 56 of the forward end of the next succeeding pipe section is adapted to fit between the inner wall of the flange 46 and the sleeve, as shown in FIGURE 6, so as to provide a tight, stepped joint between the mating ends of the pipe sections. In this respect, an outer sleeve 58 is provided and is secured by a flange 60, which fits within a suitable annular groove in the rearward end 14 of the pipe sections. The outer sleeve 58 is disposed concentrically to the inner sleeve and is spaced radially therefrom a distance substantially equal to the radial thickness of the pipe sections. Thus, as shown in FIGURE 6, the forward stepped end 16 of the next succeeding pipe section fits between the inner and outer sleeves and complements the stepped rearward end 14 of the initial pipe section. This construction is the same for the mating front and rear ends of all succeeding pipe sections so as to provide a slip type joint, which will prevent the entry of earth into the interior of the joined pipe sections, as they are moved forwardly.

It is to be particularly noted that the essence of the method of this invention involves the step-by-step or one-by-one movement of the pipe sections into the passageway as opposed to the conventional string movement of the pipe sections. Thus, means is provided whereby each pipe section is individually moved forward for a predetermined movement and the movement of the pipe sections is in sequence, beginning with the initial pipe section and going back to the last installed pipe section. Any suitable means may be provided for effecting the individual movement of the pipe sections in one-by-one sequence, beginning with the first installed and moving back along the string to the last installed pipe section.

The preferred means includes an annular tube 62, as shown in FIGURE 1, which is inflatable and is formed from any suitable and sturdy material. The tube 62 is provided with a fitting 64, which is mounted on the inner periphery thereof. The tube 62 is of an internal cross-sectional area slightly larger than the external cross-sectional area of the inner sleeve 50. In this respect, the tube 62 is disposed on the sleeve 50 and abuts the flange 54 thereof and the forward end of the flange 56 of the succeeding pipe sections, as shown in FIGURES 8 and 9. While an inflatable tube of annular shape is shown, it is to be understood that any means, reactive to hydraulic pressure, may be used. The present invention encompasses, in this regard, any hydraulically actuated means which can be disposed or positioned in direct contact with each pipe section so as to impart an axial thrust on each pipe section.

The annular tube 62 is positioned on the inner sleeve 50 and is disposed between the adjoining ends of complemental or adjacent pipe sections and is reactive on the leading pipe sections, while the succeeding pipe section is held against retrograde movement. For example, a holding dog 66 is provided and is mounted on one of the tracks in engagement with a subsequent pipe section, as shown in FIGURE 6, so as to prevent retrograde movement of the pipe section as the annular tube 62 is inflated by suitable hydraulic pressure, such as compressed air, water, oil or the like. When the annular tube is inflated the pressure is exerted solely on the adjoining pipe sections and, with the holding dog 66 in place, the forward tube section, such as the initial tube section shown in FIGURE 6, is forced forwardly into the passageway.

As shown in FIGURES 3–5, the initial pipe section is forced into the passageway by the jack and the earth, within the internal confines of the initial pipe section, is evacuated. After the initial pipe section is inserted well within the passageway, so as to almost completely clear the bore 18, the next succeeding pipe section, which is identical to the initial pipe section, is lowered by the hoist means 38 into a position on the rollers 26. The inner and outer sleeves are in place on the rearward end of the initial pipe section and the inflatable, annular tube 62 is positioned, as shown in FIGURES 8 and 9. With the holding dog 66 in operative position, any pressure imparted to the annular tube 62 will be imparted to the initial pipe section, so as to force such pipe section forwardly for a predetermined axial distance into the earth.

In order to connect the inflatable tube 62 of the initial pipe section with the fluid motive means, as shown in FIGURE 6, each of the succeeding pipe sections is formed with hanger elements 67, which are substantially T-shaped. The arms of the T-shaped hanger elements support pipes 68 and 70, which constitute inlet and outlet pipes. The pipes have their fitting ends connected to flexible tubes 72, which in turn are connected to a reservoir 74 for an actuating fluid, which is put in motion by a pump means 76, actuated by a motor or prime mover 78.

The inlet and outlet pipes 68 and 70 for each pipe section are connected to a cylinder 80, which is suitably mounted within each pipe section. The cylinder has opposing apertured end walls 82 through which rod ends 84 of a double valve 86 are slidably extended. The pipes 68 and 70 are connected to fittings 88 and 90 in the side wall of the cylinder and the valve means 86 is provided with spaced lands 92, which control the communication of the fittings with the interior of the cylinder. A flexible tubing 94 is connected to the side wall of the cylinder 80 and to the fitting 64 of the annular tube 62. The lands 92 control the communication of the fittings 88 and 90 with the tube 94 so as to control the inflation and deflation of the annular tube 62.

In this respect, it is intended that the succeeding pipe sections and their inflatable tubes be actuated in sequential movement so that, following the axial movement of the initial pipe section, the succeeding pipe sections will move in sequential order. For this purpose, control means are provided, which control means may be electrically, mechanically or manually operated so as to control the sequential inflation of the annular tubes 62 and, consequently, the axial thrust of the pipe sections.

As shown particularly in FIGURES 8 and 9, the forwardly projecting rod end 96 of the valve means has a spring 98 circumposed thereon and bearing against the forward end of the cylinder and an abutment 100 fixed by a threaded nut 102 on the rod end. The opposing or rearwardly extending rod end constitutes the armature of an electromagnet, which includes a coil 104 that is fixed on the end of the cylinder 80. When the electromagnet coil is energized through a suitable circuitry, the valve means is pulled rearwardly against the opposition of the spring 98 and, when the electromagnetic coil is de-energized, the spring is activated to move the valve means forwardly into another position.

When the electromagnetic coil is energized, as shown in FIGURE 8, the fitting 90 is communicated with the flexible tube 94 so as to conduct the hydraulic fluid to the annular tube 62 and inflate the tube. On the other hand, when the fitting 88 is communicated with the flexible tube 94, the fluid is evacuated from the tube 62 so as to deflate it.

Since there is a sequential order and movement of the pipe sections, suitable means is provided for controlling the sequential movement in step-by-step fashion. Thus, a limit switch means 106 is provided and includes a housing, within which a fixed contact 108 is mounted. A movable contact arm 110 is pivoted within the housing and provides the connection for the circuit of the electromagnetic coil 104. When the contact on the movable arm 110 is in engagement with the fixed contact 108, as shown in FIGURE 8, the electromagnetic coil is energized to move the valve means to a position in which the fluid gains entry to the inflatable tube 62. When the tube is expanded to its extreme extent, the movable contact arm 110 is urged away from the fixed contact 108 by a flexible element 112 which is connected between the protruding end of the arm 110 and the inner sleeve of the immediately adjacent pipe section, such flexible element being anchored by a U bolt 114 to the inner sleeve, as shown in FIGURES 8 and 9. When the flexible element is stretched to its extent, upon the maximum inflation of the annular tube, the movable contact arm 110 is pulled away from the fixed contact, against the urging of a spring means 116, which is mounted in the housing for the contacts. This interrupts the circuit for the electromagnetic coil 104 and permits the spring 98 to move the valve means into a position whereby the annular tube will be evacuated.

In order that the operation be sequentially controlled, upon the de-energization of the initial electromagnetic coil, it is intended that the next succeeding pipe section be moved forwardly a distance equal to the total expansion of its annular tube, which would be equal to the axial movement of the preceding pipe section, so that the electric, mechanical or manual control means 120 is operative to control such sequential energization of the electromagnetic coils, which are provided for each pipe section.

In conjunction with the control means 120, the electromagnetic coils are wired in series, as the pipes or pipe sections 68 and 70 are coupled together, upon the successive coupling of the pipe sections 10 in end-to-end engagement. The control means 120, as shown in FIGURE 10, may be of the manual, mechanically or electrically controlled type and essentially includes a disc 122 which has fixed contacts 124 disposed in peripherally spaced relation thereon. A movable contact arm 126 is mounted for rotation and is adapted to engage each of the fixed contacts 124 so as to complete an electrical circuit through the supply lines 128 to the electromagnetic coil of each pipe section 10.

Thus, assuming the movable contact arm 126 to be in engagement with the fixed contact (identified by the number 1) a circuit is established through the associated circuity 130 from the supply lines 128 to the electromagnetic coil of the initial or first pipe section. By establishment of such circuit, the electromagnetic coil of the initial pipe section is energized to move the valve means for such section into a position (as shown in FIGURE 9, for example) wherein the annular tube 62 is in communication with the hydraulic means for the inflation of the tube. It is to be understood that the holding dog 66 is in frictional, keeper relation with the center track 63 so that the pipe sections cannot move rearwardly. Therefore, the initial pipe section is forced forwardly an axial distance equal to the internal diameter of the annular tube 62, as the tube is inflated by the hydraulic medium. Upon the full and complete inflation of the tube, the flexible element 112 is extended to its maximum extent so as to pull the movable contact arm 110 away from the fixed contact 108 and interrupt the circuit. This renders the spring 98 active to move the valve into a position wherein the annular tube 62 for the initial pipe section is vented or evacuated. At the same time, the contact arm 126 is moved into engagement with the contact (identified by the number 2) for the next succeeding pipe section. The next succeeding pipe section, after the initial pipe section, then has its annular tube 62 inflated so as to move such pipe section forwardly. This action is continued, controlled by the mechanism 120, and it is obvious that any number of pipe sections can be added in the string, the action of the pipe sections being such that they are moved forwardly in sequential and orderly fashion.

After the pipe sections are moved forwardly to the desired and predetermined extent of the conduit, canal or the underground installation, that is being installed, the pipes, cylinders and the like elements are removed. In this respect, the inner sleeve is axially split so as to permit it to be easily removed, if desired. Also, in this regard, the cylinders 80 are carried by the pipes 68 and 70, which are mounted on the hangers 67. The hangers may be inserted into the pipe sections, which are preferably formed from concrete but may be formed from any other material, prior to the insertion of such pipe sections into the ground. Also, in this regard, the limit switch housing is carried by bracket means 140 that is anchored in the pipe sections, as shown in FIGURE 7.

A light 125 is connected in the supply line and is constantly illuminated when the circuit is completed through the contacts 108 and 110; if the light goes off it means that there is malfunctioning in the system.

While the preferred method and apparatus for forming the tunnels or other underground conduit, pipe or the like installations has been shown and described herein, it is to be understood that other forms may be realized, as come within the scope of the appended claims.

What is claimed is:

1. In a system for the installation of a subterranean conduit or the like wherein the conduit is composed of a plurality of individual hollow tubular sections placed in end-to-end abutting relationship so as to constitute a series including a leading end section anchored against retrogressive movement, a trailing end section, and at least one intermediate section, the combination of inner and outer sleeves overlapping the respective ends of adjacent sections in engagement therewith; inflatable tubes arranged to advance the sleeves engaged thereby responsive to expansion of the tubes, the tubes alternating with the sections and being interposed between said ends in engagement with at least one of the sleeves, said tubes being connected to a source of fluid under pressure, in a series that includes at least a leading and a trailing tube; and means, including a plurality of valve assemblies each of which is connected to one of said tubes and to said fluid source, and electrical switch assemblies operatively connected to the valve assemblies, for expanding each of said tubes in turn, in an order progressing from the leading to the trailing tube, thereby to advance said sections responsive to advancement of the sleeves in engagement therewith, in an axial direction, in an order progressing from the leading to the trailing section.

2. Apparatus as in claim 1 wherein each valve assembly includs a cylinder having a double valve enclosed therein, said double valve having rod ends projecting outwardly from the ends of said cylinder, said fluid supply source including an inlet tube and an outlet tube connected to said cylinder, one of said rod ends being provided with spring means urging said double valve to a location closing off said inlet tube from communication through said cylinder and said flexible means with the inflatable tube, and the other of said rod ends being provided with an electro-magnetic coil means to move said valve to a location opening said inlet valve to allow said inlet tube to communicate with said inflatable tube; and switch means for said coil.

3. Apparatus as in claim 2 wherein each of said switch means is arranged for activation responsive to maximum inflation of said inflatable tube to move the double valve to its position closing off the entry of fluid therein from said inlet tube.

4. Apparatus as in claim 3, wherein said switch means is provided with connection means operatively connecting the same to said inner sleeve such that the inflation of each inflatable tube is operative to move the sleeve engaged thereby to a position effective to de-activate said switch means, thereby to in turn de-activate the coil and thus evacuate said inflatable tube.

5. The apparatus of claim 4, and remote control means for sequentially controlling the operation of said valve assemblies.

6. Apparatus in a system for the installation of a subterranean conduit wherein the conduit is composed of a plurality of individual hollow tubular sections placed in end-to-end abutting relationship so as to constitute a series including a leading end section, a trailing end section anchored against retrogressive movement, and at least one intermediate section, the sections having interengaging coupled ends, inner and outer sleeves overlapping the respective ends of adjacent sections in engagement therewith, the apparatus comprising expandable annular tubes interposed between the ends to advance the sleeves engaged thereby responsive to expansion of the tubes, fluid pressure means operatively interconnecting the tubes for effecting the expansion thereof, valve means operatively connected to each of the tubes and to the fluid pressure means, and control means operating each of the valve means in response to completion of the operation of the next preceding one thereof, whereby the tubes are expanded in sequence commencing with the initial one thereof to move the sections axially in one-by-one sequential order commencing with the initial section.

7. The method of installing underground conduit of the type comprising a string of coaxial conduit sections arranged in end-to-end relation that comprises: creating an expansive force of pre-established value between the leading and second sections of the string in a direction axially thereof while restraining all but the leading section against retrogressive movement in said axial direction, thus to advance the leading section a distance bearing a predetermined ratio to said value; said force being terminated in response to the increase of the same to said pre-established value whereby the second section is permitted to advance toward the leading section and whereby an expansive force is created between the second and third sections of the string, further in response to the increase of the expansive force between the leading and second sections to said value, thus to advance the second section; the expansive force between the second and third sections being terminated in response to its increase to said pre-established value, thereby freeing the third section for advancement, whereby an expansive force is created between the third and fourth sections, further in response to increase of said expansive force between the third and fourth sections to the pre-established value; and advancing successively following sections in the same sequential order fully to but not including the trailing section of the string.

References Cited in the file of this patent

UNITED STATES PATENTS

| 1,593,871 | Godfrey-Evans | July 27, 1926 |
| 1,948,707 | Gilman | Feb. 27, 1934 |
| 2,775,869 | Pointer | Jan. 1, 1957 |

FOREIGN PATENTS

| 927,875 | France | May 19, 1947 |